United States Patent
Ilan et al.

(10) Patent No.: US 7,440,034 B2
(45) Date of Patent: Oct. 21, 2008

(54) METHOD AND APPARATUS FOR TRANSFERRING DATA WITHIN VIEWABLE PORTION OF VIDEO SIGNAL

(75) Inventors: Gabriel Ilan, Tel Aviv (IL); Haim Perski, Hod Hasharon (IL)

(73) Assignee: Optinetix (Israel) Ltd., Tel Aviv (IL)

( * ) Notice: Subject to any disclaimer, the term of this patent is extended or adjusted under 35 U.S.C. 154(b) by 171 days.

(21) Appl. No.: 10/524,276

(22) PCT Filed: Aug. 19, 2003

(86) PCT No.: PCT/IL03/00689

§ 371 (c)(1),
(2), (4) Date: Feb. 11, 2005

(87) PCT Pub. No.: WO2004/019442

PCT Pub. Date: Mar. 4, 2004

(65) Prior Publication Data

US 2005/0264694 A1    Dec. 1, 2005

Related U.S. Application Data

(60) Provisional application No. 60/404,525, filed on Aug. 20, 2002.

(51) Int. Cl.
*H04N 7/08* (2006.01)
(52) U.S. Cl. .................................... 348/473
(58) Field of Classification Search .............. 348/473, 348/553, 469, 460, 461, 552, 500, 474, 476, 348/477, 478
See application file for complete search history.

(56) References Cited

U.S. PATENT DOCUMENTS

| | | | |
|---|---|---|---|
| 3,993,861 A * | 11/1976 | Baer | 348/473 |
| 4,608,601 A | 8/1986 | Shreck et al. | |
| 4,807,031 A * | 2/1989 | Broughton et al. | 348/460 |
| 4,958,064 A * | 9/1990 | Kirkpatrick | 235/384 |
| 4,969,041 A | 11/1990 | O'Grady et al. | |
| 6,094,228 A * | 7/2000 | Ciardullo et al. | 348/473 |
| 6,211,919 B1 | 3/2001 | Zink et al. | |
| 6,351,289 B1 | 2/2002 | Chen et al. | |
| 6,535,253 B2 | 3/2003 | Barton et al. | |
| 6,661,905 B1 | 9/2003 | Chupp et al. | |
| 6,959,386 B2 * | 10/2005 | Rhoads | 713/176 |
| 6,992,726 B2 * | 1/2006 | Chupp et al. | 348/473 |
| 7,068,812 B2 * | 6/2006 | Powell et al. | 382/100 |
| 7,075,583 B2 * | 7/2006 | Reynolds et al. | 348/473 |
| 7,237,104 B2 * | 6/2007 | Philyaw | 713/1 |
| 2004/0227854 A1 * | 11/2004 | Withers et al. | 348/486 |

FOREIGN PATENT DOCUMENTS

| | | |
|---|---|---|
| WO | WO 01/03434 | 1/2001 |
| WO | WO 01/93473 | 12/2001 |

* cited by examiner

*Primary Examiner*—Paulos M Natnael

(57) ABSTRACT

A video signal has a visual image (12) and carries data for optical detection (54) via the image. The data for optical detection is encoded (52) as data bits in a plurality of lines within a defined region (14) within the image. A corresponding decoder (16, 58) uses maximal energy methods to detect the defined region prior to decoding the data.

32 Claims, 5 Drawing Sheets

METHOD AND APPARATUS FOR TRANSFERRING DATA WITHIN VIEWABLE PORTION OF VIDEO SIGNAL

RELATED PATENT APPLICATION

This application is a National Phase Application of PCT/IL03/00689 having International Filing Date of 19 Aug. 2003, which claims priority from U.S. Provisional Patent Application No. 60/404,525 filed 20 Aug. 2002.

FIELD AND BACKGROUND OF THE INVENTION

The present invention relates to a method and apparatus for transferring data over the viewable portion of a video signal, and more particularly but not exclusively to a method and apparatus that provides electronically downloadable data obtainable by optical means from a video screen.

The most common approach to applying data to a video signal currently in use is to insert data during the vertical blanking interval, such as in the generation of closed captioning signals. A major disadvantage of this method is that data in the vertical blanking interval can be removed or changed by the TV broadcaster, usually quite unintentionally, as part of the incidental operation of the broadcasting infrastructure. In certain cases the same program may be broadcast simultaneously in analog and digital formats, the data being preserved in the analog format but lost say in the digital format. Placing the data within the visual signal overcomes the problems introduced by incidental operation of the broadcasting infrastructure and thus allows a program producer to introduce data into his signal with confidence that it will be available to viewers. The program producer does not need to require the broadcaster to make changes to his broadcasting infrastructure.

An additional disadvantage of embedding data in the vertical interval is that decoding requires access to the video signal and is not possible optically using the light transmitted by the TV set. Data decoding therefore requires changes to the TV set or to the Set Top box. Embedding of the data into the screen image ensures that data transfer does not require any modifications to the end user equipment.

In order to permit optical detection, a number of patent applications therefore teach methods of placing data on the clearly visible portion of the video signal. One advantage of the latter approach is it does not require any changes to the broadcasting infrastructure or end user equipment. Patent number WO 01/03434 A1 to Gamut Interactive describes a method for embedding data on the visible portion of a video signal. U.S. Pat. No. 6,094,228 to Koplar Interactive describes an additional method for invisibly embedding data on the visible portion of a video signal. Both approaches have been tried in the past but the methods as disclosed are limited by a narrow bandwidth, and are thus unable to support transmission of large quantities of data from the TV screen to the user's device. In practice these approaches limit possible applications of the technology to the transmission of a single code or a single identification number. The commercial coupon data itself is pre-stored in the memory of a handheld device provided to the user, and the signal embedded in the video simply triggers the appearance thereof.

International Patent Application no. WO 01/93473 A2 "Systems and Methods for Distributing Information Through Broadcast Media" to the present applicant, the contents of which are hereby incorporated by reference, discloses a method and corresponding apparatus for distribution of electronic messages that are embedded in a TV video signal. The messages may for example be data that allows printing out of coupons related to commercial material currently being broadcast. The disclosure teaches optical signals that can be embedded within the screen view and further discloses a point and click device that can be pointed at the screen to detect the signals optically. In one embodiment the point and click device includes a built-in printer. Whilst the disclosure provides a major improvement in terms of bandwidth over the prior art, it leaves open questions of the best technical method for embedding data within the video screen image in order to minimize noise, maximize bandwidth and provide the data in the most convenient and reliable manner possible to the user.

SUMMARY OF THE INVENTION

It is a general object of the present invention to overcome the above disadvantages and to enable high enough bandwidth, and minimal noise for transmitting of commercial coupons and the like to the handheld devices. It is further an object to provide the data in a manner most convenient to the user. Thus, given that a user is not going to point his device at the screen at precisely the moment the program producer wants him to, it is necessary to provide the signal with a certain robustness to the time at which the user points the device.

Furthermore the user may not necessarily keep the device pointed in the right direction for the entirety of the duration needed to download the complete signal but may point, waver and then point again.

According to a first aspect of the present invention there is provided a video signal having data encoding a visual image over successive frames each frame comprising scan lines of pixels, said video signal carrying data for optical detection via said image, wherein said visual image comprises at least one defined region and said optical data is encoded within scan lines within said defined region.

Preferably, the defined region is substantially rectangular.

Preferably, said defined region comprises a plurality of substantially rectangular regions.

In one embodiment, said data for optical detection comprises a plurality of messages, each message having its own predefined rectangle which persists over successive frames for the duration of the respective message.

Preferably, said data for optical detection comprises a message, and said message is repeated cyclically over successive groups of frames.

In one embodiment, said data for optical detection comprises at least one position flag to indicate places in said cyclical repetition.

In one embodiment, said data for optical detection comprises a synchronization field to provide orientation within said cyclical repetition.

In one embodiment, said data for optical detection is arranged into a plurality of separate regions, thereby to increase message capacity.

The signal may further comprise an audible signal to indicate the beginning of said data for optical detection.

The signal may further comprise an audible signal to indicate the end of said data for optical detection.

The signal may further comprise a second audible signal to indicate the end of said data for optical detection.

In one embodiment, borders of said region are defined according to a required capacity of a message being carried by said data for optical detection.

Preferably, said data for optical detection comprises a plurality of data symbols, and each symbol is encoded in at least one of said lines of said series.

Preferably, said data for optical detection comprises a plurality of data symbols, and in which each data symbol is encoded in two of said lines of said series.

The signal may further comprise error correction encoding.

Preferably, said data for optical detection is superimposed, within said region, over an underlying image.

In one embodiment, said superimposing comprises blending with said underlying image.

In one embodiment, said rectangle is defined by a surrounding frame.

In one embodiment, said data for optical detection is modulated into said image by at least one of a group comprising black and white modulation, and color modulation, In one embodiment, said data for optical detection is modulated into said image by at least one of a group comprising frequency shift keying, and quaternary frequency shift keying.

Preferably, said data for optical detection comprises at least one of a group comprising time information and program information.

Preferably, said data for optical detection comprises a software update for a decoding device.

According to a second aspect of the present invention there is provided apparatus for encoding data for optical detection within the visual image of a video signal, the apparatus comprising:

a defining unit for defining a region within said image to carry said data for optical detection, and an encoder, associated with said defining unit, for encoding said data for optical detection into video scan lines within said region.

Preferably, said region is retained over a succession of video images.

Preferably, said encoder is configured to superimpose said data for optical detection over an image, and wherein said superimposing is confined to said region.

Preferably, said superimposing comprises blending into said image.

In one embodiment, said blending comprises invisibly blending, such that said data for optical detection is substantially invisible to a user.

Preferably, said region is substantially rectangular.

Preferably, said defined region comprises a plurality of substantially rectangular regions.

Preferably, said defining unit is configured to surround said region with a frame.

In one embodiment, said encoder is configured to encode said data for optical detection by at least one of a group comprising black and white modulation, and color modulation, In one embodiment, said encoder is configured to encode said data for optical detection by at least one of a group comprising frequency shift keying and quaternary frequency shift keying.

In one embodiment, said data for optical detection comprises a print file configured for printing.

In one embodiment, said data for optical detection comprises barcode data.

Preferably, said data for optical detection comprises at least one of a group comprising time information and program information.

In one embodiment, said data for optical detection comprises a software update for a corresponding decoding device.

Preferably, said encoder is configured to insert said data as symbols, each symbol being encoded within at least one video scan line within said region.

Preferably, said encoder is configured to insert said data as symbols, each symbol being encoded within at least two video scan lines within said region.

Preferably, said encoder is configured to insert said data for optical detection in cyclical repetition.

Preferably, said data for optical detection comprises at least one position flag to indicate places in said cyclical repetition.

Preferably, said data for optical detection comprises a synchronization field to provide orientation within said cyclical repetition.

According to a third aspect of the present invention there is provided apparatus for decoding data encoded optically within a defined region of a visual image of a video signal, said apparatus comprising:

an optical detector for optical detection of said image, an encoded region determination unit for determining, from output of said optical detector, boundaries of said defined region within said scanned image, and a data decoder associated with said encoded region determination unit for decoding data received at said optical detector that is determined to be within said defined region.

In one embodiment, the apparatus for decoding may be incorporated within a mobile device.

In one embodiment, said mobile device is a handheld device.

The apparatus preferably comprises a printer associated with an output of said data decoder, for printing out decoded data.

In one embodiment, said data for optical detection comprises an identification flag and said printer is configured to make only a predetermined number of printouts per identification flag.

In one embodiment, said predetermined number is one.

In one embodiment, said mobile device is incorporated within a mobile telephone.

In one embodiment, the apparatus is incorporated within an accessory for a mobile telephone.

In one embodiment, a software updater is included for using said decoded data for self-updating.

Preferably, said data for optical detection repeats cyclically and said decoder is operable to decode data whenever a substantially fill cycle has been detected irrespective of where in said cyclical repetition said decoding starts at.

In one embodiment, said decoder is operable to use error correction data within said data for optical detection to deduce a starting point thereof.

Preferably, said data for optical detection comprises at least one position flag to indicate places in said cyclical repetition.

Additionally or alternatively, said data for optical detection comprises a synchronization field to provide orientation within said cyclical repetition.

In one embodiment, said encoded region determination unit comprises an entropy summation unit for obtaining summations of entropy over a video image to identify said region as a region having maximal entropy.

In one embodiment, said entropy summation unit is configured to provide a sliding window to move over said image, to calculate an entropy summation for each window position and to identify said region as a window position having a maximal entropy.

In one embodiment, said encoded region determination unit is configured to provide relatively large changes in position of said sliding window between each entropy summation to provide coarse determination of said region.

In one embodiment, said encoded region determination unit is configured to provide perturbations to said coarse determination of said region to achieve fine determination of said region.

In one embodiment, said encoded region determination unit is configured to enable decoding of scan lines within a perturbation range around said region, so that data extracted therefrom can be used if said scan lines are subsequently determined to be within said region.

In one embodiment, said encoded region determination unit is configured to use a mean least squares (MLS) to achieve fine determination of said region.

In one embodiment, said entropy summation unit is configured to summate entropy over substantially all scan lines and all frequencies within said image.

Preferably, said encoded region determination unit is operable to continue to use a region as detected in previous frames of said image.

Preferably, said data for optical detection comprises symbols encoded as frequencies within said scan lines, said data decoder being operable to deduce said symbols from said frequencies.

Preferably, said data for optical detection comprises symbols, encoded in a plurality of scan lines within said region.

In one embodiment, said data decoder is operable to sum a respective plurality of scan lines, and to decode a corresponding signal from said summation.

The decoding apparatus may be configured for scanning image produced by a plurality of video encoding methods, said apparatus being operable to scan for a first method, and if energy detected falls below a predetermined minimal threshold then to restart the scanning process.

A variation of the above is configured for scanning image produced by a plurality of video encoding methods, said apparatus being operable to scan for a first method, and if energy detected falls below a predetermined minimal threshold then to scan for another one of said plurality of methods. Preferably, the variation is configured to retain a last used video encoding method as a default method for initial scanning.

In one embodiment, said decoder is configured to correct data decoding according to subsequently carried out perturbations.

According to a fourth embodiment of the present invention, there is provided decoding apparatus for decoding cyclically repeating data, said apparatus comprising:

a decoder for applying a decoding procedure to said data,
data handling logic for controlling said decoder and for outputting decoded data, and
a starting position recognizer associated with said decoder for using an output of said decoder to determine a start position of said data, said start position being used as a parameter for said data handling logic so as to ensure that said cyclically repeating data is decoded and output in a correct sequence from said start position.

Preferably, said start position recognizer is configured to recognize a synchronization field within said cyclically repeating data.

In one embodiment, said start position recognizer is an error correction circuit for operating with a cyclic redundancy code.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
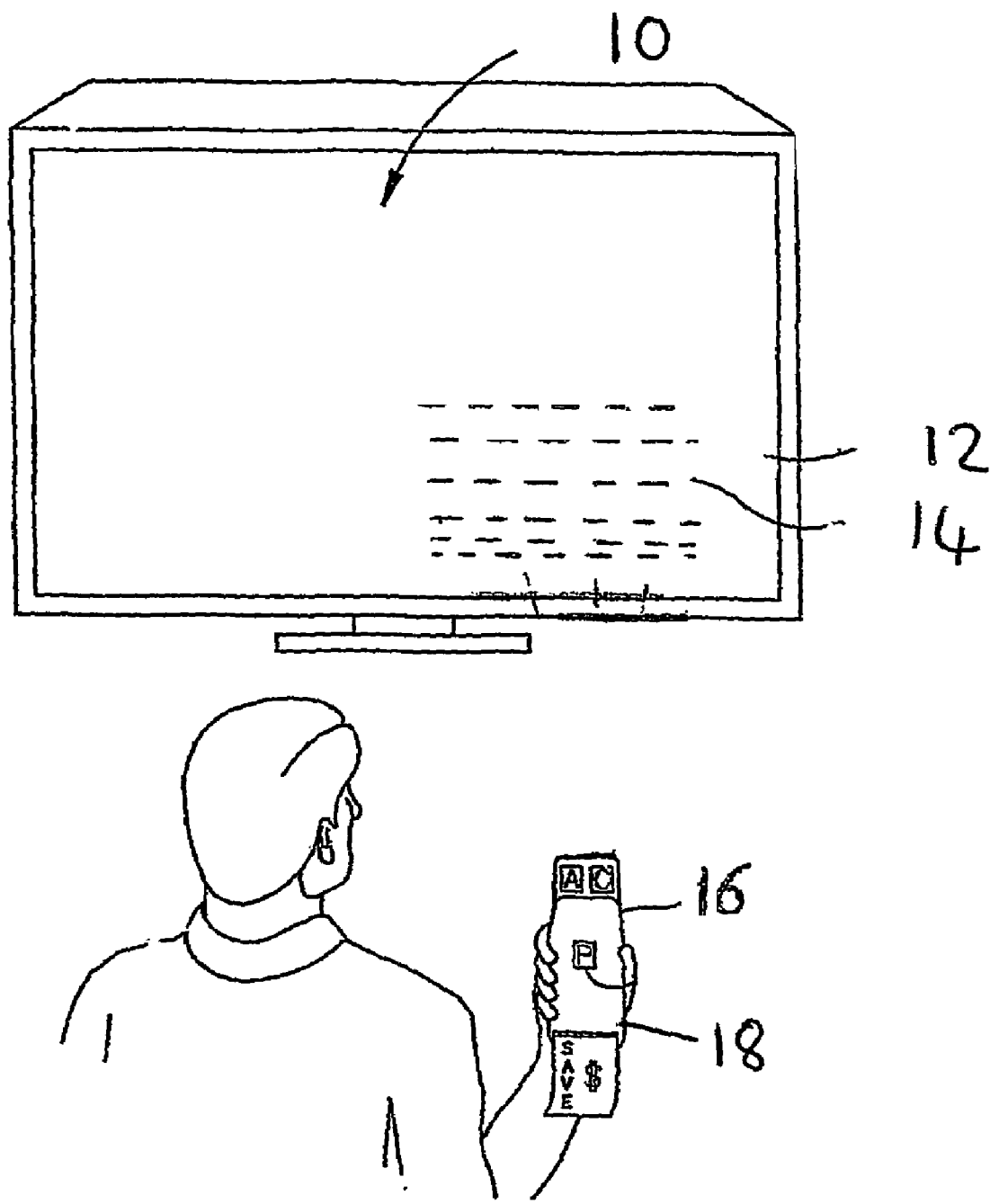
FIG. 1 is a simplified block diagram showing detection of data within a video display according to a preferred embodiment of the present invention.

The present embodiments show a method and apparatus for encoding and decoding data within the visual field of a video signal, in a manner which is more robust to use conditions and provides better signal to noise ratio than the current art.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIG. 1 illustrates data encoded in a video signal and an optical detection device according to a first preferred embodiment of the present invention. A television or like video screen 10 displays a moving image as a sequence of frames each displaying temporal versions of visual field 12. Each frame comprises a series of scan lines and each scan line comprises a sequence of pixels. A region 14 is defined within the visual field and the parts of the scan lines that are enclosed within the defined region 14 carry data. The data is detected optically by optical decoding device 16 which is located remotely from screen 10 but pointed at the screen in such a way as to provide line of sight to the screen.

Decoding device 16 is preferably a mobile device that interprets data visually embedded in a video signal. In one embodiment the data is a print file and the data is program related data added to a broadcast television signal. The mobile device preferably contains a small printer 18 which can be used to print out ticket sized items. Typical applications include coupons related to commercial broadcasts or to recipes for cookery programs or to the lyrics for songs and the like. The print file may follow a user recognizable audible tone, which primes the user to point the decoding device 16 at the screen and obtain the data, for example by pressing a download button. The download button may cause the device to detect and decode the coupon data. In one embodiment, the initial download displays the data on a screen and then a second press of the same or another button causes the file to be printed.

Printer 18 is preferably a miniature printer, and may be integrated into the mobile device as shown in the Figure. The printer may for example be a thermal or an impact printer. The printer prints out text, an optional barcode, which might be similar to the one used in existing newspaper coupons, and bitmap images such as Logos. The printer may be color or black and white.

If a printer is used, pressing the download or print button as described above results in printing out a paper coupon, which may later on be redeemed at a point of sale in a way similar to existing newspaper coupons.

Alternatively, the mobile device can be connected or incorporated into a mobile telephone. The decoded coupon may be inserted into the mobile telephone memory and may subsequently be used for redemption at points of sale or for direct purchasing via the cellular network.

One embodiment enables an advertiser to limit the maximum number of coupons that can be printed out for the same promotion. Therefore, a unique identification number may be added to the coupon data to enable tracking of the number of times a certain coupon is printed and to prevent a given device from printing when the maximum is reached, or to prevent redemption at points of sale of more than a predetermined number. It is further possible to add a maximum permitted number of printouts as an additional field within the coupon data, thus allowing more flexible control of any limits per specific message.

Use of identification data with the coupon further enables an advertiser to track the effectiveness of specific advertising routes. Thus, time, TV program or channel and like source identification may be embedded in the coupon data for gathering upon coupon redemption and later on used for advertising effectiveness analysis.

It is further possible to use the same data distribution method to provide software updates of the device without being required to collect the devices or to send maintenance personnel to consumers' homes. Therefore, in the present invention software updates may be downloaded via TV video signal, in a way analogous to message reception. The consumer may be asked, say via a message he downloads, to set the TV tuner to a specific channel which is specifically used for software updates and to activate the device when pointed to the Television.

In addition, the data download device 16 may be used as an accessory or as an integrated module in a third party consumer device. The consumer device is then able to download software updates via TV video signal. In this way new games or ringtones can be added to mobile telephones and like devices, or new speeches can be added to talking dolls or new movements added to moving robots etc.

In the case of digital broadcast, the image is transmitted as a bitstream. In one embodiment, the image that is transmitted includes the embedded data. In an alternative embodiment, the message data is transmitted as a bitstream along with the video data and is then embedded into the image by the set top box. The embedded video data, produced in this way by the set top box, is then displayed by the TV as before and captured (and printed) by the mobile device.

Figure 2:
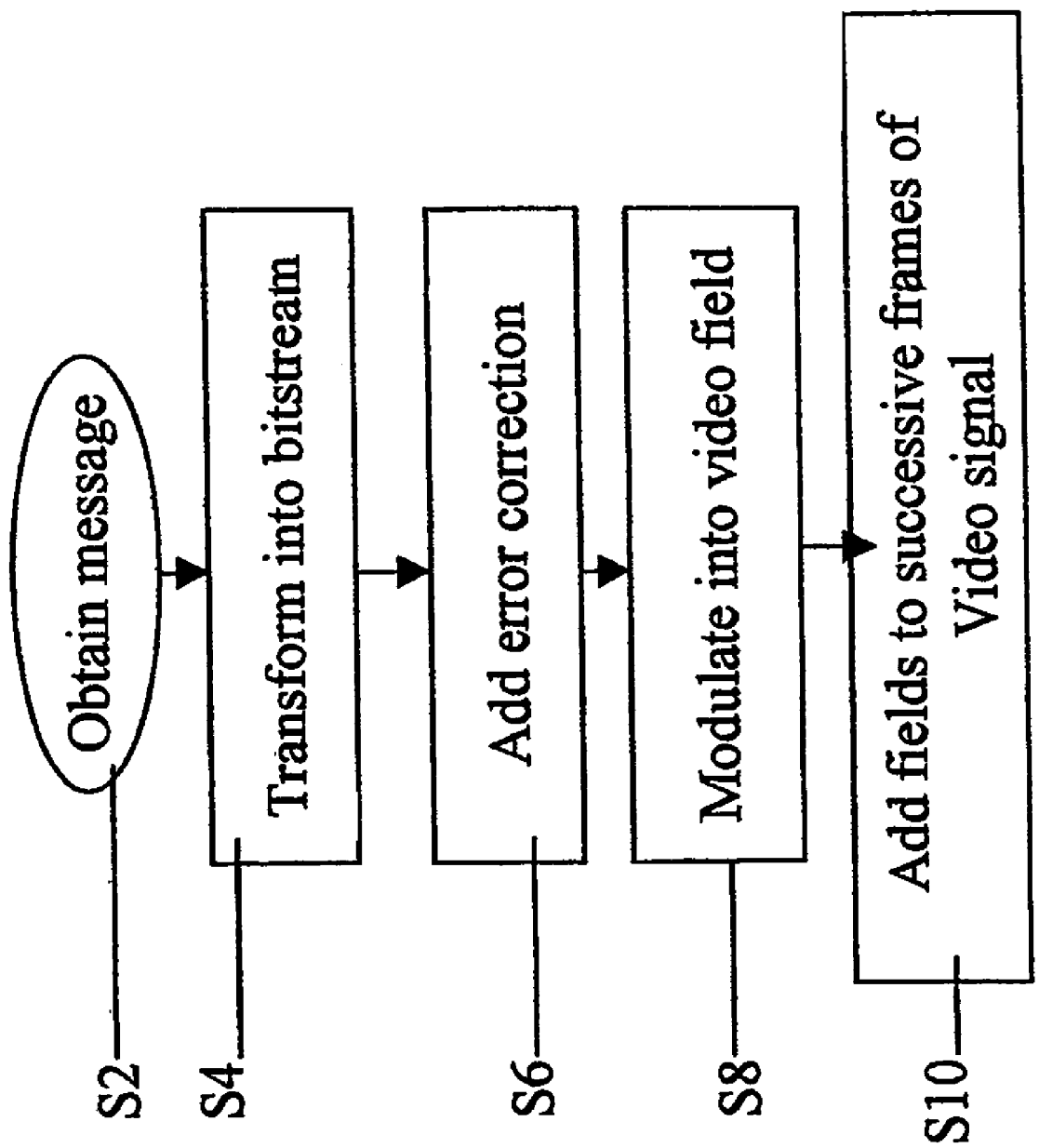
FIG. 2 is a simplified flow diagram illustrating encoding of data into a video image according to a preferred embodiment of the present invention.

Reference is now made to FIG. 2, which is a simplified diagram illustrating a procedure for incorporating a data file into the visible part of a video field and then subsequently incorporating the video field into an overall video signal according to a preferred embodiment of the present invention. In a stage S2, a message file is obtained. In a stage S4 the data is converted into a stream of bits.

In a stage S6 error correction encoding is added to the bit stream, and suitable redundancy check schemes will be discussed in greater detail below. The individual bits of the bit stream are then modulated onto the scan lines that make up a typical image representation in a video signal, in stage S8, and then in stage S10 the scan lines are written into defined regions within successive video frames. The defined region is typically a rectangle, or window, and in one embodiment the modulated data overwrites successive lines in the rectangle. When the final line is reached in a rectangle then the data overwriting continues with the first line of the same rectangle in the next frame. Decoding accuracy can be improved by allowing the same data to persist for more than one frame, in which case writing continues with the next group of frames.

Preferably, encoding of data into the video signal should be possible both in a real time working environment and in advance off-line preparation.

A number of modulation schemes are possible. In one possible modulation scheme, each sequence of bits is represented by a specific frequency out of a predefined set of frequencies. In a preferred embodiment, the length of the sequence is 1 bit and the set of frequencies includes two frequencies, one represents '0' and the other represents '1' (FSK modulation). Thus a scan line where the intensity varies between high and low at one rate is read as a one, and a scan line where the intensity varies between high and low at a different rate is read as a zero. However, other alternatives can be selected such as a set of four frequencies that represents a sequence of two bits (QFSK) and the like.

In a preferred embodiment, a square wave pattern is used to represent the bits. However, it should be noticed that other wave patterns, such as sine, could be used as well.

In the present embodiments, data is blended into pre-defined windows within the video frame. The size and location of the windows remain constant for a specific message insertion. For example the size of the window may be selected in accordance with the quantity of data and the location may be selected to minimize adverse effects on the scene being viewed. Different sizes and locations can thus be used for various insertions. In a preferred embodiment, the number of data windows is one. However, in order to enlarge the data bandwidth it is possible to use more than one data window simultaneously.

As explained above, a data window comprises a plurality of video scan lines, each modulated with data in an optically detectable manner. When the region is rectangular, all of the data lines are substantially equal in length. In FSK, a data line is modulated with a specific frequency signal. In a preferred embodiment two sequential lines represent each bit. However, in other embodiments a bit could be represented by a single line, to achieve higher baud rate, or represented by more than two lines, to achieve better SNR (Signal to Noise Ratio).

In a preferred embodiment, the modulated bits replace, that is overwrite, the original video signal. Overwriting achieves maximum data energy. However, it is also possible to add the value of the modulated signal to the value of the original video signal, in a process known as alpha blending. Doing so, while reducing the intensity of the modulated data, is useful for reducing the visual interference of the data to the original video. By reducing the intensity of the modulated data to a very low amplitude, the data can actually be invisible to the normal viewer, whilst still being detectable by an optical device.

In a preferred embodiment, the data is modulated equally over the visible color spectrum without emphasizing any specific color (i.e. black and white modulation). However, in additional embodiment colors could be integrated in the modulated data. White sections, as an example, could be entirely or partially replaced by Blue sections. Black sections could be entirely or partially replace by Red or Green sections. The purpose of the colors could be either to improve the visual appearance of the data or to improve the detection of the data. Improved detection can be achieved if a sensor that is more sensitive to a certain color is then used to detect the signal. In addition, detection may be improved if the TV display emits more energy in response to a predetermined specific color.

In a preferred embodiment, no frame surrounds the data window. However, it is possible to surround the data window with a frame. The frame may be of a specific color or specific pattern or any combination of the above. The purpose of having such a frame may be either to improve the visual appearance of the data or to improve detection of the data.

Stage S6 comprises the insertion of an error correction code into the bitstream. The correction code allows subsequent decoding to overcome a certain level of bit errors and therefore increases the tolerance of the system to noise. Different embodiments may improve the baud rate by not using error correction, but at the cost of decreased tolerance to noise.

In a preferred embodiment a (850,485,79) binary BCH code is used. The maximum number of data bits in such as code is 485, and 365 additional redundant bits are added to provide a code in which up to 39 errors can be corrected. It is possible, however, to use a different error correction code or use the same code with different parameters. Further more, it is possible to use the (850,485,79) BCH code for sending less than 485 data bits. In this case both the encoder and decoder assume that the non-used bits have a constant value, such as '0', which is known in advance. The non-used bits, in such a case, are not actually embedded in the video signal.

In the present embodiment, data is sent in packages. Each group of bits, which may include both data and error correction bits, is sent as a single package. A short package may be inserted into a single field or window. Longer packages are usually inserted over more than one field, or more than one video frame. In general, it is possible to encode and insert into the video stream either a single package or multiple packages.

In a preferred embodiment, coupon information is encoded in one data package and the package is inserted several times into the video stream in a cyclic manner. Thus, the first field of a new package instance is rebroadcast directly after the last field of the previous instance of the same data. Thus if the user fails to point his decoder at the stream at the very start of the data, it is still possible to download a complete cycle of the data. Furthermore, provided that the decoder is able to identify the start of the data correctly and process it in the correct order, it does not matter what order the data is scanned in. Thus the decoder can begin to scan data from the end of the cycle and continue from the beginning, and nevertheless decode and present the data in the correct order. Hence, the detection system is able to commence scanning the cyclic data immediately and does not need to wait for the beginning of a new package before detection can start. This is useful since the user may have limited patience to point the device, or may not hold the device steady for a long period of time.

In a preferred embodiment, the data package, for example an advertising coupon, lasts for 26 video fields. Since the data fields are inserted cyclically, the original message can be reconstructed out of any sequential 26 fields, no matter which field was the first to be detected. However, a decoder is preferably able to determine where the message starts in order to decode it, and in a preferred embodiment, an additional synchronization field is inserted at the beginning of each package. The synchronization field has a pre-defined pattern of bits that can be identified easily by the decoder to be interpreted as the beginning of the data package. An example for such a synch field is a field with all the bits set to '1'.

If data is encoded with a powerful error correction code, such as the (850,485,79) binary BCH code, the synchronization field can be avoided, allowing for a slightly higher baud rate. In the case of such a code, the decoder can loop over the detected fields, trying to start the message with each field as if it was the start field. The error correction code ensures that the message can only be decoded correctly if the correct field is selected to be the start of the message. The main disadvantage of such a code is the relatively high consumption of CPU resources during decoding, since a worst-case scenario, that of starting scanning from the second field, involves making twenty six attempts at decoding the message. Therefore, a synchronization field is preferred, even when using such a BCH error correction code.

In a preferred embodiment, decoding is implemented in hand held mobile device 16. Device 16 is intended to be small and simple and thus needs to be able to decode the data with minimum usage of memory and CPU resources. In one embodiment, data is scanned in and decoded directly. In another embodiment, however, decoding is implemented in two phases. A first phase involves data being sampled and stored in memory and a second phase involves the stored data being processed and decoded.

Figure 3:
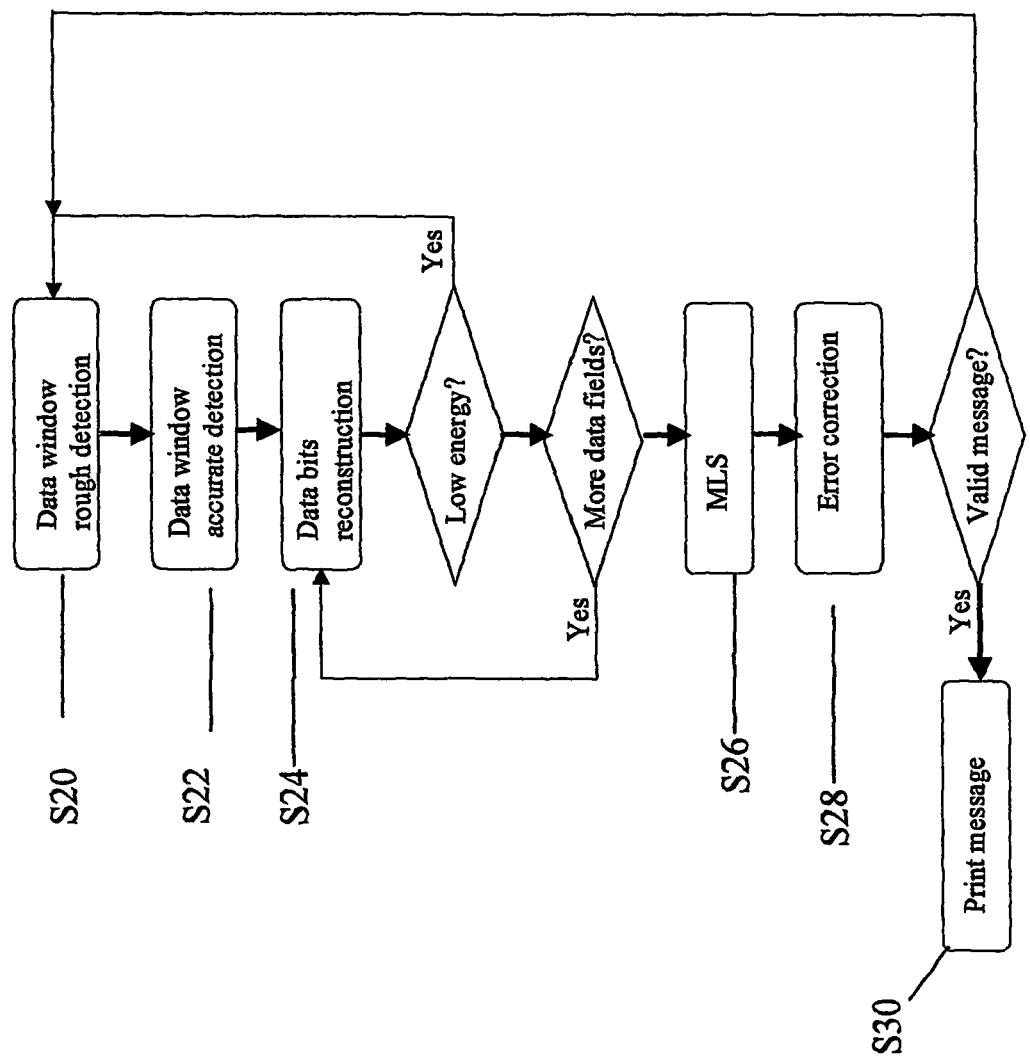
FIG. 3 is a simplified flow diagram showing decoding of data from a sequence of video images according to a preferred embodiment of the present invention.

Reference is now made to FIG. 3, which is a simplified flow diagram illustrating a preferred implementation of a decoding algorithm suitable for use with embodiments of the present invention. In the implementation of FIG. 3, decoding is done in the following steps:

Rough detection of the data window position over the video frame S20

Accurate detection of the data window position over the video frame S22

Bit reconstruction S24
Back correction of window position S26
Error correction decoding S28

Preferably, the data is decoded in as high an SNR environment as possible, which means first of all that the position of the data window needs to be located as accurately as possible. Therefore, in a preferred embodiment, the detection algorithm focuses on fine positioning of the data window within the stream of samples. As soon as the window position is accurately detected, the data can be compared synchronously to available wave patterns, enabling highest detection probability.

Stage S20 comprises a rough positioning of the data window over the video frame. The goal of stage S20 is to find an inaccurate position of the data in the stream of samples, while using minimum memory and CPU resources, and preferably also to make the positioning determination in the minimum amount of time.

The rough positioning finds the point in which the energy of the data signal is maximal. The algorithm looks for such energy maxima over a pre-defined number of samples, which between them represent at least one frame of video display.

In a preferred embodiment, line energy is defined by the sum of the relevant frequencies following DFT (Discrete Fourier Transform). If FSK is used, the energy is the sum of two DFTs, for the two relevant frequencies. It is noted that in order to save computation, it is possible to change the order and sum the lines prior to calculation of the DFT transform.

In the following, the term "window energy" refers to the sum of the window line energy. In a preferred embodiment, a rough location algorithm comprises sliding a sampling window over the data samples, and then calculating the window energy for each window location. In order to save CPU resources, the window is moved over pre-defined intervals, the interval being relatively large, both in the X and Y-axis. Preferably, sampling is carried out in units of two megaHertz and the window scanning interval is 12 samples. Thus, the final position as calculated by stage S20 is inevitably inaccurate as it is dependent upon the movement interval. Preferably, even for rough location, the sliding window positions overlap to some extent, so as not to miss the actual maximum altogether.

A further embodiment saves CPU resources in the rough location stage by dropping some of the scan lines within the current window when calculating the energy for the window. In a preferred embodiment, lines are processed in an interval of 4 so that only one quarter of the window is actually used for energy calculation.

Detection stage S22 comprises an accurate positioning of the data window over the video frame. The input for stage S22 is the inaccurate position obtained in stage S20. The data samples that are used for the second stage may conveniently be taken from a field in a video frame that follows the frame that was used for the first stage. The second stage may use a frame that follows directly or indirectly from the frame used in the first stage.

In a preferred embodiment, the algorithm knows the video rate in advance. It is therefore able to calculate the position of a sample, that is to say a timing in terms of video scanning that represents a certain location on the frame, from a sample position that represents the same location in a previous field.

Since both the video rate and the sampling clock have some imprecision, it is preferable to allow a certain inaccuracy in either the video rate or the sampling clock.

Knowing the inaccurate position of the data window in a previous frame from stage 20, the algorithm predicts the inaccurate position of the window in the current field as being substantially the same position. Then, a second window is defined by adding margins to the data window. The second window is bigger than the data window but is also placed in the inaccurately predicted location. The algorithm stores data extracted from the second window in memory for processing, which can be left until later with fewer timing constrains. As soon as the scan of the second window is stored in memory, the algorithm moves a data size window over the scan to find the position having the maximum energy. At this stage the movement interval in both axes is one sample. In a preferred embodiment, in order to save CPU resources, the algorithm looks for a maximum in one axis (Y, for example) and than for a maximum in the orthogonal axis.

Stage S24 comprises recovering the encoded data bits from the sampled video signal. Stage S24 may be performed more than once if the data is embedded in more than one video field. The input for stage S24 is the accurate position of the data window as retrieved in stage S22.

In a preferred embodiment, refining of the data window position automatically starts stage S24. That is to say recovering of data bits can start as soon as the energy is maximized. Such an embodiment allows for some inaccuracy in the video rate or sampling clock. The position refining in this embodiment may be carried out in a way similar to the process described above as stage S22 except that the window margins can be different in this case since the input position is more accurate.

Data bit recovery from the window comprises looking for a frequency having maximum energy for each line in the data window. The symbol represented by the maximal energy is selected as the raw data. In a preferred embodiment, in which only two frequencies are used (FSK), the algorithm actually compare energies of two frequencies and selects '1' or '0' in accordance with the frequency giving the higher energy.

In one of the embodiments referred to above, each data symbol is represented by more than one line. In such a case the relevant lines are summed prior to making the energy calculations. In a preferred embodiment, two sequential lines represent a symbol, and therefore the two lines are summed prior to energy comparison.

The line energy in a certain frequency may be calculated by DFT or FFT (Fast Fourier Transform). However, in a preferred embodiment, comparison is made between the Real part of the DFT rather than its magnitude. Doing so when the DFT window is synchronized to the data window is more efficiency and more accurate since what it amounts to is that phase information is taken into account.

The present embodiment enables decoding of the data even when noise energy is greater than the signal energy. However, a difficulty that arises with the present embodiments is that it makes it difficult to correctly locate the data window in the first place. Thus the algorithm of FIG. 3 is likely to mistakenly position the data window to start at an incorrect line. A preferred embodiment thus attempts to read bits from above and below the predicted data window. In the next algorithm stage, when the window position is refined, the spare bits are already present, should it be decided that they are part of the window after all, and no additional reading is necessary.

Preferred embodiments are robust to use conditions, and robustness includes enabling quick detection of messages even if the sensor is originally pointed in the wrong direction and only subsequently is moved towards the TV. In such a robust embodiment, the algorithm continuously watches for data window energy. As long as the device points to real data, energy that is received by sequential fields is more or less similar and step S24 leads to step S26, discussed below.

Otherwise, energy variation in sequential fields is large and the algorithm breaks its normal flow and loops back to step S20.

In a preferred embodiment, an MLS (Mean Least Square) stage S26 refines the data window positions of the previously detected fields, using the positions retrieved by the previous stages S20 and S22. One way of refining the windows position is by using an MLS process. Since frames are equally spaced in time, it is possible to represent the beginning of data window by a linear equation such as:

$$s=a*n+b$$

Where n stands for the number of the field and s stands for the number of the sample that starts the data window of the field n. a and b are linear equation parameters.

In a preferred embodiment, the MLS process is activated recursively, deleting points that fall far away from the linear line between iterations, until a low standard deviation line is achieved. Using the MLS output, data window positions are updated.

If the actual position of the window is different from the position detected by a bit recovery process, than the bits collected from above or below the previous window positions are used to correct the mistake.

In a preferred embodiment, a stage S28 of error correction is included. If data is transmitted repeatedly in cyclic manner, errors can be corrected as soon as all data fields are received, regardless of which one of the fields is received first. However, as discussed above, in order to correct the errors and interpret the message, the algorithm preferably determines the position of the first data field within the sequence as received.

As mentioned above, the encoder may use a synchronization field, for example a field with all the bits set to '1'. Then the decoder sorts the received data fields according to the number of '1' symbols in each field, and decoding starts with the field that follows the one having the maximum number of '1' symbols.

If a synchronization field is not used, the decoder tries to correct errors starting with one of the fields and if it fails it moves on to the next field until it succeeds. As mentioned above, such a procedure is expensive in terms of CPU resources.

A preferred embodiment of the decoder 16 is universal, in that it supports data encoding into a variety of video encoding methods, in particular NTSC, PAL-A, PAL-B, SECAM, etc. Different video encoding methods utilize different detection algorithm parameters such as number of samples in field, video rate, etc.

It is possible to use devices specifically programmed with the different configurations and parameters for the different encoding methods. However, a universal device is preferred. The universal device preferably detects the encoding method automatically as follows. An encoding method is set as default and used in initial scanning. If no valid data is detected using the current transmission method for a certain time, say 5 seconds, the algorithm switches to a different set of parameters trying to detect valid data in a new transmission method, and so-on. Once data is detected, the new method is stored in non-volatile memory, such as FLASH memory, and is used as the default method for the next activation of the device.

Figure 4:
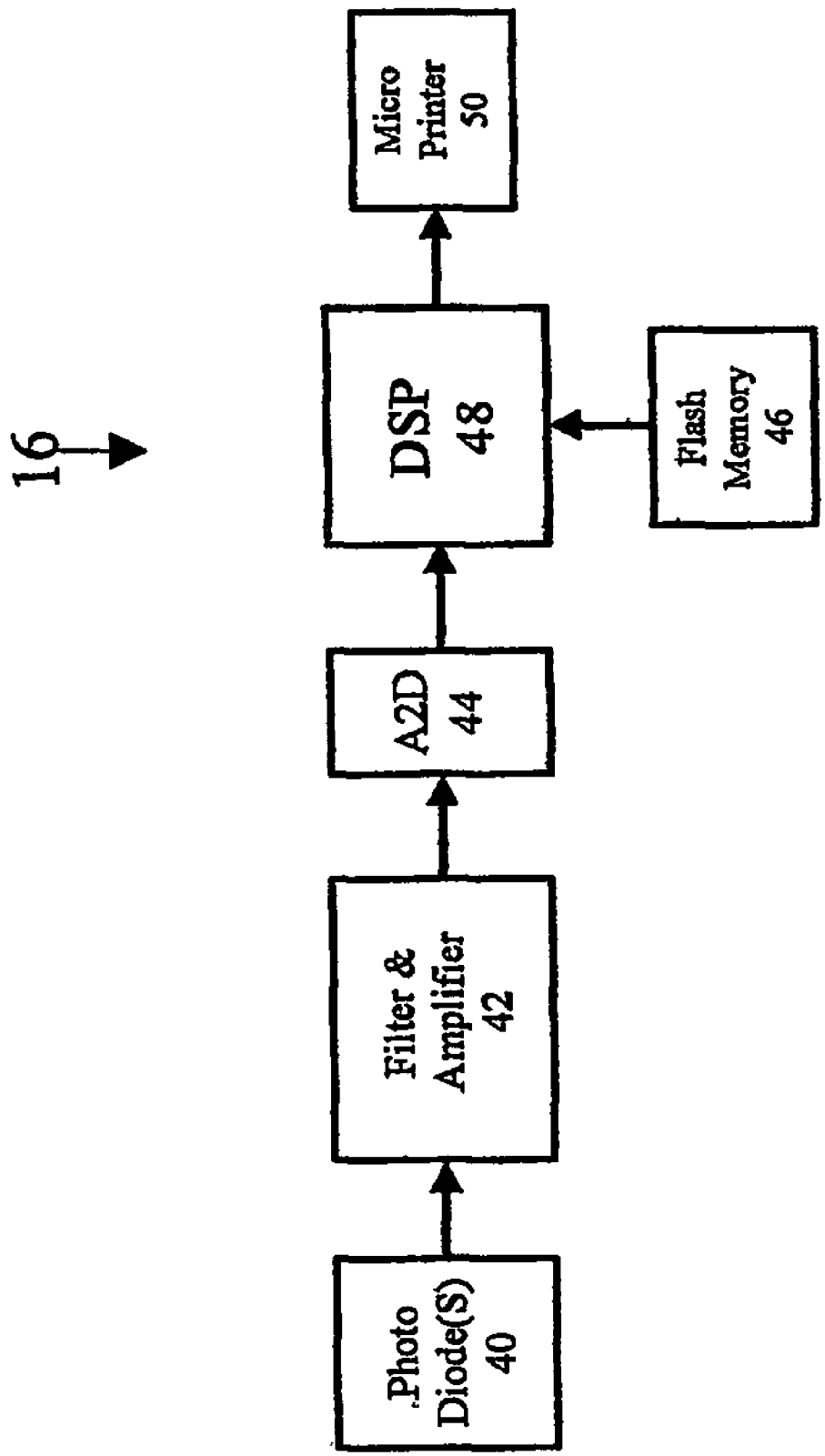
FIG. 4 is a simplified block diagram illustrating a decoding device according to a preferred embodiment of the present invention.

Reference is now made to FIG. 4, which is a block diagram of a preferred embodiment of mobile device 16. Light emitted by the TV display is received by a one or more photo diodes 40.

As the user is aware, the television picture comprises pixel positions scanned in scan lines many times a second. The human eye sees a static picture due to the human eye's property of persistence. However the photo diode 40 merely sees successive pixels being lit up on a dark screen. The photo diode can obtain data from the screen by simply registering the brightness picked up from the screen at any given timing, the registered brightness indicating the current pixel. The position of the pixel is inferred by the timing.

The use of more than one photo diode gives the device greater resilience to the angle at which is being held towards the screen. The signal is then amplified and filtered by a band pass filter 42. Next, the signal is sampled and digitized by an A to D converter 44. In a preferred embodiment, a sampling rate for the converter is 2 MHz and the filter cut off frequency is about 700 KHz. Code including algorithms for the embodiment are stored in a non-volatile Flash memory 46, which is read and processed by a DSP 48. In order to improve performance, some of the code is read from the Flash 46 during start up and stored in faster DSP internal memory, from where it is subsequently executed. If a valid message is decoded, then the decoded message is sent from the DSP 48 and printed out by a Micro Printer 50, also located on the mobile device.

Figure 5:
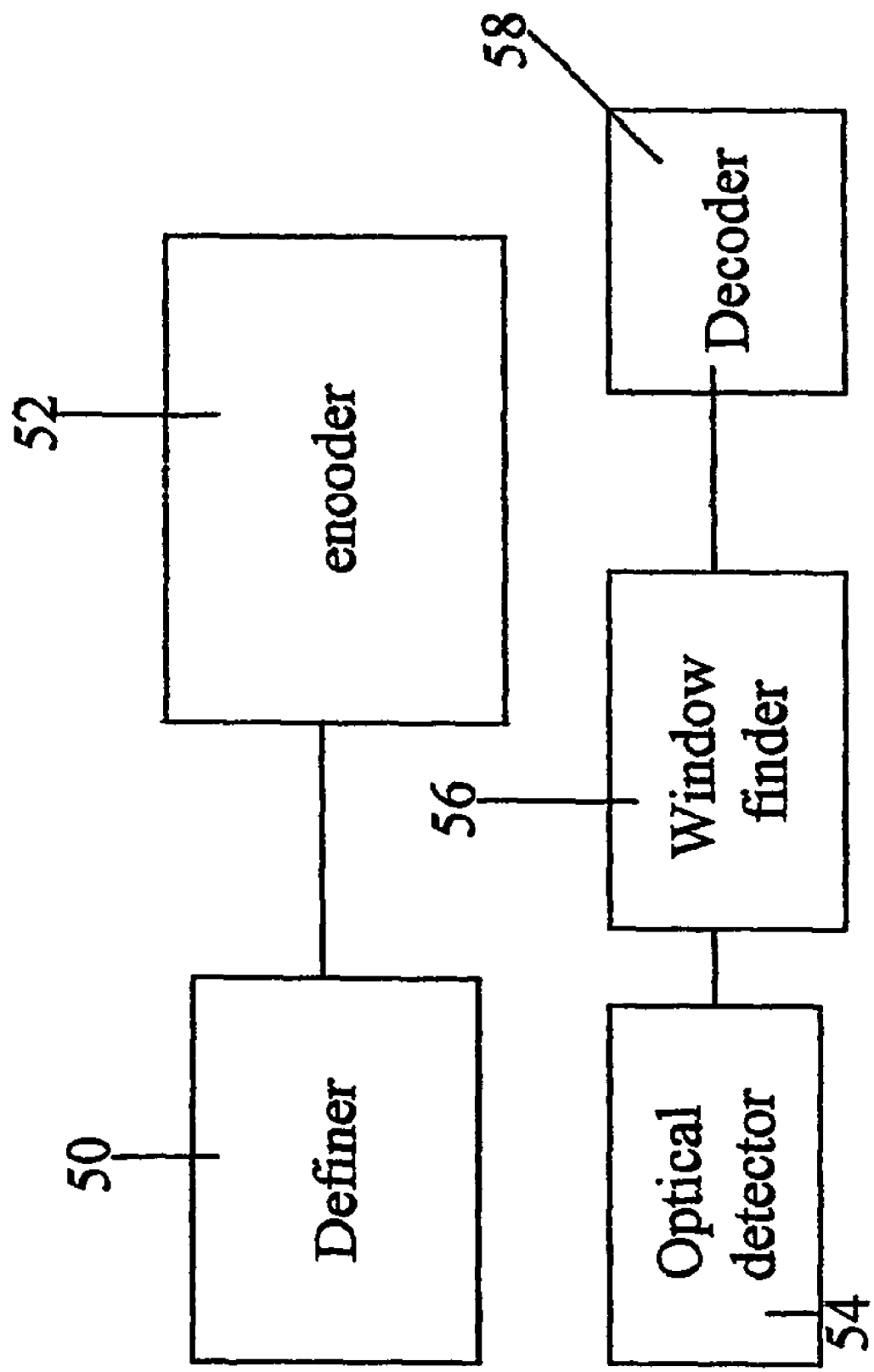
FIG. 5 is a simplified block diagram illustrating simplified encoding and decoding devices according to an embodiment of the present invention.

Reference is now made to FIG. 5, which is a system diagram showing encoding and decoding apparatus according to the present invention. Encoding apparatus includes a window definer 50 for defining a data window in which the data is to be located within the video signal. An encoder 52 subsequently encodes the message or data file for embedding within the window. At the decoder end, an optical scanner 54 scans the video screen. A window finder arrangement 56 as described above locates the data window within the screen, as discussed above, and a decoder 58 decodes the data as described.

The skilled person will be aware that a video signal contains a sound component, a visual component and control and timing information. The visual component comprises a series of frames that make up the moving image, and the frame comprises two fields of interleaved scan lines. For the purpose of the claims which follow, it is this visual component into which the data for optical detection is inserted.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. Apparatus for encoding data for optical detection within the visual image of a video signal, the apparatus comprising: a defining unit for defining a region within said visual image to carry said data such that said data is detectable by optical detection from said visual image of said video signal, and an encoder, associated with said defining unit, for encoding said data for optical detection into video scan lines within said image region such that said detection comprises optical observation of said scan lines, wherein said data for optical detection comprises barcode data.

2. Apparatus for encoding data for optical detection within the visual image of a video signal, the apparatus comprising: a defining unit for defining a region within said visual image to carry said data such that said data is detectable by optical detection from said visual image of said video signal, and an encoder, associated with said defining unit, for encoding said data for optical detection into video scan lines within said image region such that said detection comprises optical observation of said scan lines, wherein said data for optical detection comprises a software update for a corresponding decoding device.

3. Apparatus for decoding data encoded optically within a defined region of a visual image of a video signal, said apparatus comprising: an optical detector for optical detection of said image, an encoded region determination unit for determining, from output of said optical detector, boundaries of said defined region within said scanned image, and a data decoder associated with said encoded region determination unit for decoding data received at said optical detector that is determined to be within said defined region, further comprising a printer associated with an output of said data decoder, for printing out decoded data.

4. Apparatus for decoding according to claim 3, incorporated within a mobile device.

5. Apparatus for decoding according to claim 4, wherein said mobile device is a handheld device.

6. Apparatus according to claim 3, wherein said data for optical detection comprises an identification flag and said printer is configured to make only a predetermined number of printouts per identification flag.

7. Apparatus according to claim 6, wherein said predetermined number is one.

8. Apparatus for decoding according to claim 4, wherein said mobile device comprises a mobile telephone.

9. Apparatus for decoding according to claim 3, comprising an accessory for a mobile telephone.

10. Apparatus for decoding according to claim 3, further comprising a software updater for using said decoded data for self-updating.

11. Apparatus for decoding according to claim 3, wherein said data for optical detection repeats cyclically and said decoder is operable to decode data whenever a substantially full cycle has been detected irrespective of where in said cyclical repetition said decoding starts at.

12. Apparatus for decoding according to claim 11, wherein said decoder is operable to use error correction data within said data for optical detection to deduce a starting point thereof.

13. Apparatus for decoding according to claim 11, wherein said data for optical detection comprises a synchronization field to provide orientation within said cyclical repetition.

14. Apparatus for decoding according to claim 3, wherein said data for optical detection comprises at least one position flag to indicate places in said cyclical repetition.

15. Apparatus for decoding according to claim 3, wherein said encoded region determination unit comprises an entropy summation unit for obtaining summations of entropy over a video image to identify said region as a region having maximal entropy.

16. Apparatus for decoding according to claim 15, wherein said entropy summation unit is configured to provide a sliding window to move over said image, to calculate an entropy summation for each window position and to identify said region as a window position having a maximal entropy.

17. Apparatus for decoding according to claim 16, wherein said encoded region determination unit is configured to provide relatively large changes in position of said sliding window between each entropy summation to provide coarse determination of said region.

18. Apparatus for decoding according to claim 17, wherein said encoded region determination unit is configured to provide perturbations to said coarse determination of said region to achieve fine determination of said region.

19. Apparatus for decoding according to claim 15, wherein said encoded region determination unit is configured to enable decoding of scan lines within a perturbation range around said region, so that data extracted therefrom can be used if said scan lines are subsequently determined to be within said region.

20. Apparatus according to claim 17, wherein said encoded region determination unit is configured to use a mean least squares (MLS) to achieve fine determination of said region.

21. Apparatus for decoding according to claim 15, wherein said entropy summation unit is configured to summate entropy over substantially all scan lines and all frequencies within said image.

22. Apparatus for decoding according to claim 18, wherein said decoder is configured to correct data decoding according to subsequently carried out perturbations.

23. Apparatus for decoding according to claim 3, wherein said encoded region determination unit is operable to continue to use a region as detected in previous frames of said image.

24. Apparatus for decoding according to claim 3, wherein said data for optical detection comprises symbols encoded as frequencies within said scan lines, said data decoder being operable to deduce said symbols from said frequencies.

25. Apparatus for decoding according to claim 3, wherein said data for optical detection comprises symbols encoded in a plurality of scan lines within said region.

26. Apparatus according to claim 25, wherein said data decoder is operable to sum a respective plurality of scan lines, and to decode a corresponding signal from said summation.

27. Apparatus for decoding according to claim 3, configured for scanning image produced by a plurality of video encoding methods, said apparatus being operable to scan for a first method, and if energy detected falls below a predetermined minimal threshold then to restart the scanning process.

28. Apparatus for decoding according to claim 3, configured for scanning image produced by a plurality of video encoding methods, said apparatus being operable to scan for a first method, and if energy detected falls below a predetermined minimal threshold then to scan for another one of said plurality of methods.

29. Apparatus for decoding according to claim 28, being configured to retain a last used video encoding method as a default method for initial scanning.

30. Apparatus for decoding data according to claim 3, said apparatus comprising: a decoder for applying a decoding procedure to said data, data handling logic for controlling said decoder and for outputting decoded data, and a starting position recognizer associated with said decoder for using an output of said decoder to determine a start position of said data, said start position being used as a parameter for said data handling logic so as to ensure that said cyclically repeating data is decoded and output in a correct sequence from said start position.

31. Decoding apparatus according to claim 30, wherein said start position recognizer is configured to recognize a synchronization field within said cyclically repeating data.

32. Decoding apparatus according to claim 30, wherein said start position recognizer is an error correction circuit for operating with a cyclic redundancy code.

* * * * *